United States Patent [19]
Gravley

[11] 3,937,621
[45] Feb. 10, 1976

[54] FILTER BAG CUFF

[75] Inventor: Mark L. Gravley, Oregon, Ohio

[73] Assignee: Phillips Petroleum Company, Bartlesville, Okla.

[22] Filed: Nov. 25, 1974

[21] Appl. No.: 526,943

[52] U.S. Cl. .............. 55/377; 55/378; 55/381; 55/502; 55/507; 55/528; 112/262
[51] Int. Cl.² ............ B01D 46/02; D05B 97/00
[58] Field of Search .................. 55/374–379, 55/381, 492, 497, 502, 507, 511, 513, 528, DIG. 16, DIG. 26; 112/262, 265

[56] References Cited
UNITED STATES PATENTS

| | | | |
|---|---|---|---|
| 1,574,422 | 2/1926 | Feind | 55/DIG. 26 |
| 2,308,309 | 1/1943 | Ruemelin et al. | 55/377 |
| 2,576,310 | 11/1951 | Ruemelin | 55/377 |
| 2,885,028 | 5/1959 | Sylvan | 55/374 |
| 3,419,151 | 12/1968 | Smith et al. | 55/378 X |
| 3,422,602 | 1/1969 | Janson | 55/378 |
| 3,429,107 | 2/1969 | Graves | 55/378 |
| 3,473,300 | 10/1969 | Wilm et al. | 55/302 |
| 3,524,304 | 8/1970 | Wittemeier et al. | 55/378 X |
| R18,822 | 5/1933 | Paine | 55/377 |

OTHER PUBLICATIONS

Filters Bags of Teflon Fiber, E. I. Du Pont De Nemours and Co., Wilmington, Del., 9–14–73.
Properties and Processing of Teflon Fiber, Bulletin T–10, E. I. Du Pont De Nemours and Co., Wilmington, Del., 4–65.
GAF Technical Data Bulletin No. F69-1-Rev., GAF Corp., Greenwich, Connecticut, 1969.

Primary Examiner—Bernard Nozick
Assistant Examiner—Kathleen J. Prunner

[57] ABSTRACT

A filter bag which, when installed, exhibits an improved seal between the thimble and the bag is provided by (1) encasing the ring member in fabric, (2) by incorporating a fabric sleeve concentric with the cuff of the bag or (3) by incorporating two ring members in the bag cuff.

14 Claims, 5 Drawing Figures

FILTER BAG CUFF

This invention relates to filter bags.

In many industries there exists the problem of removing suspended solids from a stream of gas which is to be vented to the atmosphere. In some instances, it is desirable, from an economic standpoint, to recover the solids. In other instances, it is desirable, particularly in congested populated areas, to remove the solids from the vented gases to avoid pollution of the atmosphere. Various designs of different types of filtering equipment have been developed and are in use at the present time. One type of filtering apparatus used is that commonly called the "bag filter."

A typical bag filter apparatus comprises an air-tight housing which is divided into upper and lower chambers by an apertured plate. Filter bags, closed at one end and open at the other end, are installed in the upper chamber. The bags are suspended by the closed end and are anchored to the apertured plate at the open end by tube plate thimbles and retainer rings on the bags. A solids-laden gas, such as carbon black smoke, is introduced into the lower chamber by suitable conduit means. The gas passes through the filter bags which trap the dust, into the upper chamber, thence through a second conduit means. It is important that there be an effective seal between the lower and upper chambers to ensure that all the solids-laden gas pass through the filter bags.

Because of the fairly close tolerance between the thimble and the retainer ring, any foreign material, such as rust, between the thimble and retainer ring provides leakage paths for the solids-laden gas to bypass the filter bag. Recently, several installations have begun to use filter bags fabricated from polytetrafluoroethylene fabric. Such bags are difficult to install due to the thinness of the fabric which decreases the allowable tolerance between the thimble and retaining ring.

This invention is concerned with means for providing an effective seal between the retaining ring of a filter bag and the apertured plate thimble.

It is an object of this invention to provide an improved filter bag.

It is another object of this invention to provide an improved filter bag fabricated from polytetrafluoroethylene fabric.

Other objects, aspects and advantages of this invention will be readily apparent to those skilled in the art from the reading of the following disclosure.

In accordance with the present invention, there is provided an improved filter bag comprising an elongated, tubular, fabric body having first and second ends, the first end being closed and the second end open and terminating in a cuff having a flexible ring member disposed therein.

In one embodiment, the ring member is encased in fabric which is separate from the fabric of the bag.

In another embodiment, the filter bag has a fabric sleeve positioned concentrically with the cuff.

In yet another embodiment there is provided a filter bag having two flexible ring members disposed in the cuff.

A more complete understanding of the invention will be had by reference to the accompanying drawing of which FIGS. 1 and 2 are elevational views, partly in section, of a filter bag made in accordance with the first-described embodiment of this invention.

Figure 1:
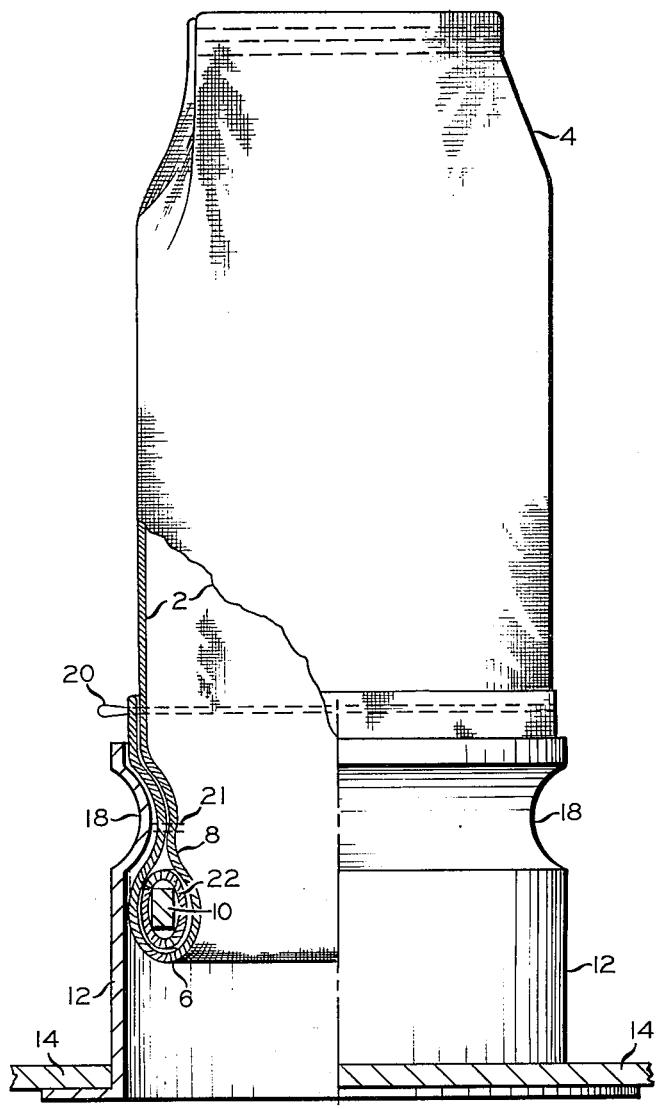

FIG. 1 illustrates a filter bag 2 in elongated tubular form having a closed end 4 and an open end 6, the open end terminating in a cuff 8 having disposed therein a ring member 10. The filter bag is supported at the closed end 4 by means not shown and is connected at the lower end 6 to a thimble 12 positioned in and projecting upwardly from a corresponding opening in apertured plate 14. Thimble 12 is welded to apertured plate 14. The thimble 12 has a holder 18 which is a peripheral indentation of the thimble.

The cuff 8 is formed in the lower edge of the filter as by turning back the edge and stitching it, as at 20 and 21, in a manner that will be readily understood. A ring member 10 is located in the cuff, the ring member being formed of a flexible material that will enable it to be slightly distorted so that it can be inserted and removed through the opening in thimble 12 and be positioned below holder 18. The ring member is generally formed of a metal, although other materials can be used, consistent with the end use of the filter system. In the embodiment shown, the ring member 10 is encased in a fabric 22, which fabric encased ring member is then enclosed by the cuff 8.

Figure 2:
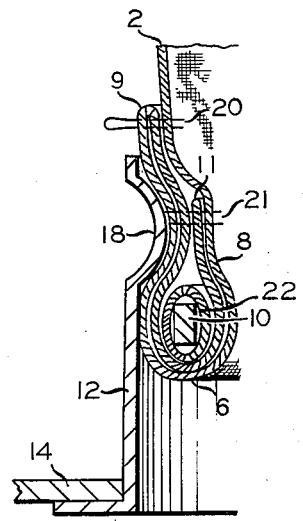

As shown in FIG. 2, the cuff 8 can also be formed by backfolding the lower end of the bag on the outside wall to provide a substantial overlap, thereafter placing the ring 10, encased in fabric 22, as shown and again backfolding the resulting bottom double end 9 of the bag over ring 10. The amount of fold is regulated so that the double fold at 9 extends higher on the bag than the raw edge 11 (i.e., the unhemmed or cut edge of the bag) so that upon stitching at 20 and 21 the raw edge is blind.

Figure 3:
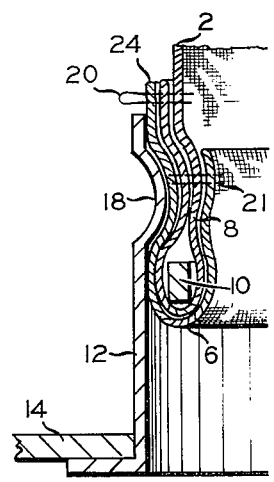
FIGS. 3 and 4 are elevational views, partly in section, of the lower portion of a filter bag made in accordance with the second-described embodiment of this invention.

FIG. 3 illustrates the lower portion of an elongated tubular filter bag 2 wherein the lower end terminates in a cuff 8 having disposed therein a ring member 10. In this embodiment, a fabric sleeve 24 is positioned concentrically with the cuff 8.

Figure 4:
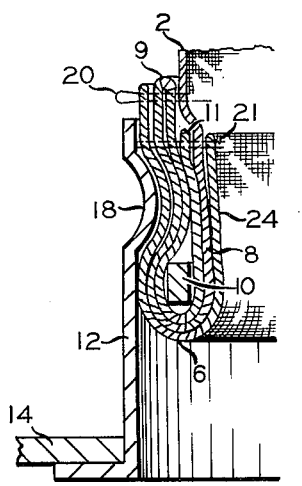

As shown in FIG. 4, the cuff 8 can also be formed by backfolding the lower end of the bag on the outside wall to provide a substantial overlap, thereafter placing ring 10 as shown and again backfolding the resulting bottom double end 9 over ring 10. The amount of fold is regulated so that the double fold at 9 extends higher on the bag than the raw edge 11 so that upon stitching at 20 and 21 the raw edge is blind.

Figure 5:
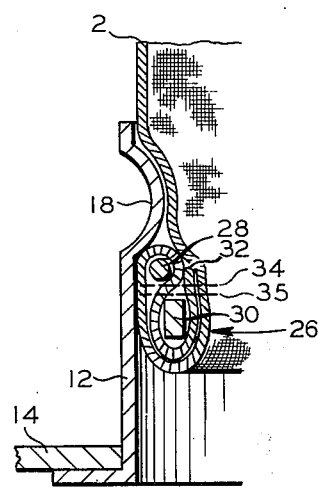
FIG. 5 illustrates a filter bag having two ring members disposed in the cuff.

FIG. 5 illustrates the lower portion of an elongated tubular filter bag 2 wherein the lower end terminates in a cuff 26 having disposed therein first and second ring members 28 and 30, respectively. The cuff 26 is formed in the lower edge of the filter as by emplacing the first ring member 28 and turning back the edge 32 over the first ring member. It may be desirable to stitch the edge 32 to the bag to facilitate emplacement of the second ring member, which is then emplaced around the bag above the cuff enclosed first ring member. The cuff, having disposed therein the first ring member 28, is then turned back over the second ring member 30 and stitched, as at 34 and 35, to maintain the ring members in properly spaced relationship. The amount of fold is regulated so that the first ring member 28 is higher on the bag than the raw edge 32, so that upon stitching at 34 and 35 the raw edge is blind.

At least one of the ring members 28 and 30 can be encased in a fabric as shown in FIGS. 1 and 2 and the fabric-encased ring member(s) can then be enclosed by the cuff 26.

The present invention is applicable to filter bags fabricated from any gas-permeable dust-arresting fabric employed heretofore. It is particularly applicable, however, to bags fabricated from polytetrafluoroethylene fabric. Typically, such fabric has a weave design of 3 × 1 twill, a weight of 8 oz. per square yard, a thickness of 0.01 inches, a thread count of 75 ends per inch in the warp and 62 picks per inch in the filling, and a porosity of 20 to 40 cubic feet per minute per sq. ft. of bag surface at a pressure of 0.5 inches of water.

The fabric which is used to encase the ring member as in the first-described embodiment or to fabricate the sleeve as in the second-described embodiment can be the same material as is used to fabricate the bag or it can be different. This fabric can be woven or it can be a felt. When the bag is fabricated from polytetrafluoroethylene woven fabric, it is preferred that the ring-encasing fabric or the sleeve fabric also be polytetrafluoroethylene, either a woven fabric or felt. In a presently preferred embodiment, this fabric is polytetrafluoroethylene felt.

The filter bags of the present invention provide a tighter seal around the retaining portion of the thimble than bags used heretofore. The present invention also allows the use of a smaller diameter ring member without loss of sealing efficiency, thus providing greater ease of installation of the bag end in the thimble.

The filter bags of this invention can be fabricated by methods presently employed in the art. When fabricating the bag of the first embodiment of this invention, i.e., a filter bag having a fabric-enclosed ring member in the bag cuff, it may be advisable to glue the ring-encasing fabric to the ring, to prevent the fabric from bunching. It is recommended that the lower row of stitching be placed as close to the ring member as possible.

Reasonable variations and modifications, which will be apparent to those skilled in the art, can be made in this invention without departing from the spirit and scope thereof.

I claim:

1. A filter bag comprising an essentially tubular, elongated fabric body, said fabric body having a first end and a second end, said first end being closed and said second end being open, said second end terminating in a cuff having been formed by turning back the edge of said second end and stitching same to said bag, said cuff having disposed therein at least one fabric-encased ring member.

2. The bag of claim 1 wherein said fabric body is fabricated from a polytetrafluoroethylene woven fabric.

3. The bag of claim 2 wherein said fabric has a porosity of 20 to 40 cubic feet per minute per square foot of surface at a pressure of 0.5 inches of water.

4. The bag of claim 1 wherein said fabric encasing said ring is a polytetrafluoroethylene fabric.

5. The bag of claim 3 wherein said encasing fabric is woven.

6. The bag of claim 3 wherein said encasing fabric is a felt.

7. The method of forming a cuff on a filter bag, said bag comprising an essentially tubular, elongated fabric body, said fabric body having a first end and a second end, said first end being closed and said second end being open, said second end terminating in a cuff having disposed therein a first ring member and a second ring member, wherein at least one of said ring members is fabric-encased, which comprises emplacing said first ring member around said bag and turning back the edge of said second end over said first ring member thereby forming a cuff, emplacing said second ring member around said bag above said cuff-enclosed first ring member, turning back said cuff having said first ring member disposed therein over said second ring member and stitching said cuff to said bag between said first and second ring members.

8. The method of claim 7 wherein said fabric body is fabricated from a polytetrafluoroethylene woven fabric.

9. The method of claim 8 wherein said fabric encasing at least one of said ring members is a polytetrafluoroethylene fabric.

10. The method of claim 9 wherein said encasing fabric is woven.

11. The method of claim 9 wherein said encasing fabric is a felt.

12. A filter bag comprising an essentially tubular, elongated fabric body, said fabric body having a first and a second end, said first end being closed and said second end being open, said second end terminating in a cuff, said cuff having disposed therein a first ring member and a second ring member, said cuff having been formed by emplacing said first ring member around said bag and turning back the edge of said second end over said first ring member, thereby forming a cuff, emplacing said second ring member around said bag above said cuff-enclosed first ring member, turning back said cuff having said first ring member disposed therein over said second ring member, and stitching said cuff to said bag between said first and second ring members.

13. The bag of claim 12 wherein said fabric body is fabricated from a polytetrafluoroethylene woven fabric.

14. The bag of claim 13 wherein said fabric has a porosity of 20 to 40 cubic feet per minute per square foot of surface at a pressure of 0.5 inches of water.

* * * * *

UNITED STATES PATENT AND TRADEMARK OFFICE
CERTIFICATE OF CORRECTION

PATENT NO. : 3,937,621

DATED : February 10, 1976

INVENTOR(S) : Mark L. Gravley

It is certified that error appears in the above-identified patent and that said Letters Patent are hereby corrected as shown below:

Column 4, claim 5, line 6, after "claim" delete "3" and insert therefor --- 4 ---.

Column 4, claim 6, line 8, after "claim" delete "3" and insert therefor --- 4 ---.

Signed and Sealed this

*fifteenth* Day of *June 1976*

[SEAL]

Attest:

RUTH C. MASON
*Attesting Officer*

C. MARSHALL DANN
*Commissioner of Patents and Trademarks*